(12) United States Patent
Ohta et al.

(10) Patent No.: US 12,295,023 B2
(45) Date of Patent: May 6, 2025

(54) TERMINAL DEVICE, BASE STATION DEVICE, AND WIRELESS COMMUNICATION SYSTEM

(71) Applicant: FUJITSU LIMITED, Kawasaki (JP)

(72) Inventors: Yoshiaki Ohta, Yokohama (JP); Yoshihiro Kawasaki, Kawasaki (JP); Nobuhisa Aoki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 397 days.

(21) Appl. No.: 17/356,611

(22) Filed: Jun. 24, 2021

(65) Prior Publication Data

US 2021/0321425 A1 Oct. 14, 2021

Related U.S. Application Data

(63) Continuation of application No. PCT/JP2019/005417, filed on Feb. 14, 2019.

(30) Foreign Application Priority Data

Dec. 28, 2018 (WO) ............... PCT/JP2018/048454

(51) Int. Cl.
*H04W 72/543* (2023.01)
*H04L 5/00* (2006.01)
*H04W 72/566* (2023.01)

(52) U.S. Cl.
CPC ......... *H04W 72/543* (2023.01); *H04L 5/0048* (2013.01); *H04W 72/566* (2023.01)

(58) Field of Classification Search
CPC . H04W 72/543; H04W 72/566; H04W 72/21; H04W 28/02; H04L 5/0048; Y02D 30/70
See application file for complete search history.

(56) References Cited

U.S. PATENT DOCUMENTS

2010/0184445 A1* 7/2010 Tseng ............... H04W 72/21
455/450
2018/0070378 A1* 3/2018 Quan ............... H04W 72/12
(Continued)

FOREIGN PATENT DOCUMENTS

CN 101790191 A 7/2010
CN 109041245 A 12/2018
(Continued)

OTHER PUBLICATIONS

Fujitsu, SR procedure with multiple SR configurations, 3GPP TSG-RAN WG2 Meeting #99bis, Prague, Czech Republic, Oct. 9-13, 2017, R2-1710358. (Year: 2017).*
(Continued)

*Primary Examiner* — Shailendra Kumar
(74) *Attorney, Agent, or Firm* — Myers Wolin, LLC

(57) ABSTRACT

A terminal device includes: a receiver configured to receive a signal including configuration information related to a scheduling request configuration associated with a logical channel; and a controller configured to control a counter associated with the scheduling request configuration. The controller controls, when the receiver receives a signal including configuration information related to a reconfiguration of the scheduling request configuration, the counter in accordance with at least one of the scheduling request configuration after the reconfiguration and a state of the scheduling request.

13 Claims, 13 Drawing Sheets

(56) References Cited

U.S. PATENT DOCUMENTS

| | | | | |
|---|---|---|---|---|
| 2018/0139030 A1* | 5/2018 | Kim | ...................... | H04W 72/20 |
| 2018/0359766 A1* | 12/2018 | Shih | ...................... | H04W 72/12 |
| 2021/0100019 A1* | 4/2021 | Liu | ................... | H04W 74/0833 |
| 2021/0258989 A1* | 8/2021 | Zhang | ................... | H04W 72/20 |

FOREIGN PATENT DOCUMENTS

| | | | |
|---|---|---|---|
| EP | 2 211 585 A1 | 7/2010 | |
| JP | 2010-171952 A | 8/2010 | |
| JP | 2018-207493 A | 12/2018 | |
| WO | WO-2015020478 A1 * | 2/2015 | ........ H04W 72/1284 |
| WO | 2020136922 A1 | 7/2020 | |

OTHER PUBLICATIONS

First Notification of Office Action and Search Report issued by the China National Intellectual Property Administration for corresponding Chinese Patent Application No. 201980086026.3, mailed on Jun. 29, 2023, with an English translation.

International Search Report issued by the Japan Patent Office for corresponding International Patent Application No. PCT/JP2019/005417, mailed on Mar. 12, 2019, with an English translation.

Fujitsu, "SR procedure with multiple SR configurations", Agenda Item: 10.3.1.5, 3GPP TSG-RAN WG2 #99bis, R2-1710358, Revision of R2-1708865, Prague, Czech Republic, Oct. 9-13, 2017.

LG Electronics Inc., "Discussion on SR counter handling in consideration of sr-ProhibitTimer", Agenda Item: 10.3.1.8 (NR_newRAT-Core), 3GPP TSG-RAN WG2 Meeting #104, R2-1818116, Spokane, USA, Nov. 12-16, 2018.

3GPP TS 36.133 V15.3.0, "3rd Generation Partnership Project; Technical Specification Group Radio Access Network; Evolved Universal Terrestrial Radio Access (E-UTRA); Requirements for support of radio resource management (Release 15)", Jun. 2018.

3GPP TS 36.211 V15.2.0, "3rd Generation Partnership Project; Technical Specification Group Radio Access Network; Evolved Universal Terrestrial Radio Access (E-UTRA); Physical channels and modulation (Release 15)", Jun. 2018.

3GPP TS 36.212 V15.2.1, "3rd Generation Partnership Project; Technical Specification Group Radio Access Network; Evolved Universal Terrestrial Radio Access (E-UTRA); Multiplexing and channel coding (Release 15)", Jul. 2018.

3GPP TS 36.213 V15.2.0, "3rd Generation Partnership Project; Technical Specification Group Radio Access Network; Evolved Universal Terrestrial Radio Access (E-UTRA); Physical layer procedures (Release 15)", Jun. 2018.

3GPP TS 36.300 V15.2.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)", Jun. 2018.

ETSI TS 136 321 V15.2.0, "LTE; Evolved Universal Terrestrial Radio Access (E-UTRA); Medium Access Control (MAC) protocol specification (3GPP TS 36.321 version 15.2.0 Release 15)", Jul. 2018.

ETSI TS 136 322 V15.1.0, "LTE; Evolved Universal Terrestrial Radio Access (E-UTRA); Radio Link Control (RLC) protocol specification (3GPP TS 36.322 version 15.1.0 Release 15)", Jul. 2018.

ETSI TS 136 323 V15.0.0, "LTE; Evolved Universal Terrestrial Radio Access (E-UTRA); Packet Data Convergence Protocol (PDCP) specification (3GPP TS 36.323 V15.0.0 Release 15)", Jul. 2018.

3GPP TS 36.331 V15.2.2, "3rd Generation Partnership Project; Technical Specification Group Radio Access Network; Evolved Universal Terrestrial Radio Access (E-UTRA); Radio Resource Control (RRC); Protocol specification (Release 15)", Jun. 2018.

3GPP TS 36.413 V15.2.0, "3rd Generation Partnership Project; Technical Specification Group Radio Access Network; Evolved Universal Terrestrial Radio Access Network (E-UTRAN); S1 Application Protocol (S1AP) (Release 15)", Jun. 2018.

3GPP TS 36.423 V15.2.0, "3rd Generation Partnership Project; Technical Specification Group Radio Access Network; Evolved Universal Terrestrial Radio Access Network (E-UTRAN); X2 application protocol (X2AP) (Release 15)", Jun. 2018.

3GPP TS 36.425 V15.0.0, "3rd Generation Partnership Project; Technical Specification Group Radio Access Network; Evolved Universal Terrestrial Radio Access Network (E-UTRAN); X2 interface user plane protocol (Release 15)", Jun. 2018.

3GPP TS 37.340 V15.2.0, "3rd Generation Partnership Project; Technical Specification Group Radio Access Network; Evolved Universal Terrestrial Radio Access (E-UTRA) and NR; Multi-connectivity; Stage 2 (Release 15)", Jun. 2018.

3GPP TS 38.201 V15.0.0, "3rd Generation Partnership Project; Technical Specification Group Radio Access Network; NR; Physical layer; General description (Release 15)", Dec. 2017.

3GPP TS 38.202 V15.2.0, "3rd Generation Partnership Project; Technical Specification Group Radio Access Network; NR; Services provided by the physical layer (Release 15)", Jun. 2018.

3GPP TS 38.211 V15.2.0, "3rd Generation Partnership Project; Technical Specification Group Radio Access Network; NR; Physical channels and modulation (Release 15)", Jun. 2018.

3GPP TS 38.212 V15.2.0, "3rd Generation Partnership Project; Technical Specification Group Radio Access Network; NR; Multiplexing and channel coding (Release 15)", Jun. 2018.

3GPP TS 38.213 V15.2.0, "3rd Generation Partnership Project; Technical Specification Group Radio Access Network; NR; Physical layer procedures for control (Release 15)", Jun. 2018.

3GPP TS 38.214 V15.2.0, "3rd Generation Partnership Project; Technical Specification Group Radio Access Network; NR; Physical layer procedures for data (Release 15)", Jun. 2018.

3GPP TS 38.215 V15.2.0, "3rd Generation Partnership Project; Technical Specification Group Radio Access Network; NR; Physical layer measurements (Release 15)", Jun. 2018.

3GPP Ts 38.300 V15.2.0, "3rd Generation Partnership Project; Technical Specification Group Radio Access Network; NR; NR and NG-RAN Overall Description; Stage 2 (Release 15)", Jun. 2018.

3GPP TS 38.321 V15.2.0, "3rd Generation Partnership Project; Technical Specification Group Radio Access Network; NR; Medium Access Control (MAC) protocol specification (Release 15)", Jun. 2018.

3GPP TS 38.322 V15.2.0, "3rd Generation Partnership Project; Technical Specification Group Radio Access Network; NR; Radio Link Control (RLC) protocol specification (Release 15)", Jun. 2018.

3GPP TS 38.323 V15.2.0, "3rd Generation Partnership Project; Technical Specification Group Radio Access Network; NR; Packet Data Convergence Protocol (PDCP) specification (Release 15)", Jun. 2018.

3GPP TS 38.331 V15.2.1, "3rd Generation Partnership Project; Technical Specification Group Radio Access Network; NR; Radio Resource Control (RRC) protocol specification (Release 15)", Jun. 2018.

3GPP TS 38.401 V15.2.0, "3rd Generation Partnership Project; Technical Specification Group Radio Access Network; NG-RAN; Architecture description (Release 15)", Jun. 2018.

3GPP TS 38.410 V15.0.0, "3rd Generation Partnership Project; Technical Specification Group Radio Access Network; NG-RAN; NG general aspects and principles (Release 15)", Jun. 2018.

3GPP TS 38.413 V15.0.0, "3rd Generation Partnership Project; Technical Specification Group Radio Access Network; NG-RAN; NG Application Protocol (NGAP) (Release 15)", Jun. 2018.

3GPP TS 38.420 V15.0.0, "3rd Generation Partnership Project; Technical Specification Group Radio Access Network; NG-RAN; Xn general aspects and principles (Release 15)", Jun. 2018.

3GPP TS 38.423 V15.0.0, "3rd Generation Partnership Project; Technical Specification Group Radio Access Network; NG-RAN; Xn application protocol (XnAP) (Release 15)", Jun. 2018.

3GPP TS 38.470 V15.2.0, "3rd Generation Partnership Project; Technical Specification Group Radio Access Network; NG-RAN; F1 general aspects and principles (Release 15)", Jun. 2018.

3GPP TS 38.473 V15.2.1, "3rd Generation Partnership Project; Technical Specification Group Radio Access Network; NG-RAN; F1 application protocol (F1AP) (Release 15)", Jul. 2018.

(56) References Cited

OTHER PUBLICATIONS

3GPP TR 38.801 V14.0.0, "3rd Generation Partnership Project; Technical Specification Group Radio Access Network; Study on new radio access technology: Radio access architecture and interfaces (Release 14)", Mar. 2017.
3GPP TR 38.802 V14.2.0, "3rd Generation Partnership Project; Technical Specification Group Radio Access Network; Study on New Radio Access Technology Physical Layer Aspects (Release 14)", Sep. 2017.
3GPP TR 38.803 V14.2.0, "3rd Generation Partnership Project; Technical Specification Group Radio Access Network; Study on new radio access technology: Radio Frequency (RF) and co-existence aspects (Release 14)", Sep. 2017.
3GPP TR 38.804 V14.0.0, "3rd Generation Partnership Project; Technical Specification Group Radio Access Network; Study on New Radio Access Technology; Radio Interface Protocol Aspects (Release 14)", Mar. 2017.
3GPP TR 38.900 V15.0.0, "3rd Generation Partnership Project; Technical Specification Group Radio Access Network; Study on channel model for frequency spectrum above 6 GHz (Release 15)", Jun. 2018.
3GPP TR 38.912 V15.0.0, "3rd Generation Partnership Project; Technical Specification Group Radio Access Network; Study on New Radio (NR) access technology (Release 15)", Jun. 2018.
3GPP TR 38.913 V15.0.0, "3rd Generation Partnership Project; Technical Specification Group Radio Access Network; Study on Scenarios and Requirements for Next Generation Access Technologies; (Release 15)", Jun. 2018.
International Search Report issued by the Japan Patent Office for corresponding International Patent Application No. PCT/JP2018/048454, mailed on Feb. 5, 2019, with an English translation.

* cited by examiner

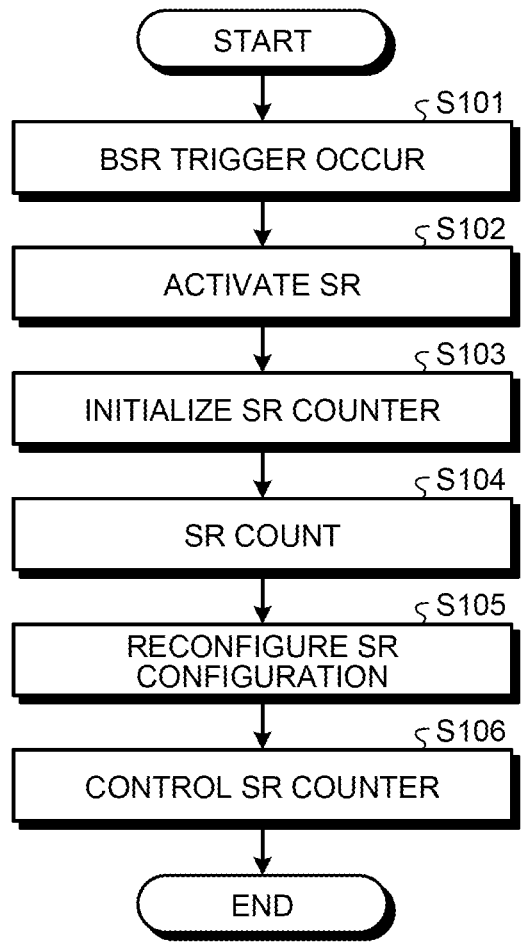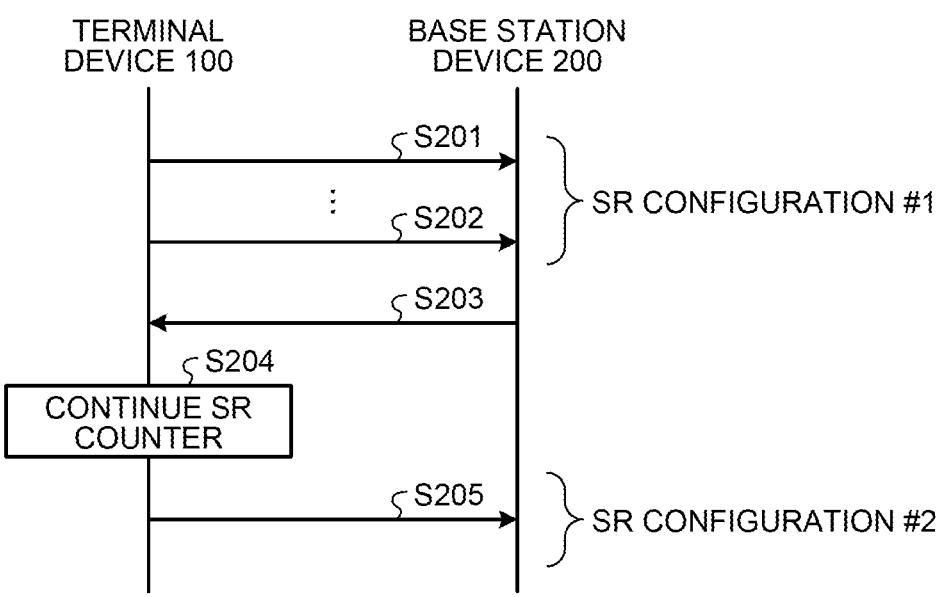

FIG.5

5.4.4 Scheduling Request

The Scheduling Request (SR) is used for requesting UL-SCH resources for new transmission.

The MAC entity may be configured with zero, one, or more SR configurations. An SR configuration consists of a set of PUCCH resources for SR across different BWPs and cells. For a logical channel, at most one PUCCH resource for SR is configured per BWP.

Each SR configuration corresponds to one or more logical channels. Each logical channel may be mapped to zero or one SR configuration, which is configured by RRC. As long as The SR configuration of the logical channel that triggered the BSR (subclause 5.4.5) is mapped to one SR configuration (if such a configuration exists), the SR configuration is considered as corresponding SR configuration for the triggered SR.

FIG.7

5.4.4 Scheduling Request

The Scheduling Request (SR) is used for requesting UL-SCH resources for new transmission.

The MAC entity may be configured with zero, one, or more SR configurations. An SR configuration consists of a set of PUCCH resources for SR across different BWPs and cells. For a logical channel, at most one PUCCH resource for SR is configured per BWP.

Each SR configuration corresponds to one or more logical channels. Each logical channel may be mapped to zero or one SR configuration, which is configured by RRC. The SR configuration of the logical channel that triggered the BSR (subclause 5.4.5) (if such a configuration exists) is considered as corresponding SR configuration for the triggered SR.

...

If an SR is triggered and there are no other SRs pending corresponding to the same SR configuration, the MAC entity shall set the SR_COUNTER of the corresponding SR configuration to 0.

When an SR is triggered, it shall be considered as pending until it is cancelled. When reconfiguration of SR functionality occurs by upper layer, all pending SR(s) are cancelled.

FIG.8

5.4.4 Scheduling Request

The Scheduling Request (SR) is used for requesting UL-SCH resources for new transmission.

The MAC entity may be configured with zero, one, or more SR configurations. An SR configuration consists of a set of PUCCH resources for SR across different BWPs and cells. For a logical channel, at most one PUCCH resource for SR is configured per BWP.

Each SR configuration corresponds to one or more logical channels. Each logical channel may be mapped to zero or one SR configuration, which is configured by RRC. The SR configuration of the logical channel that triggered the BSR (subclause 5.4.5) (if such a configuration exists) is considered as corresponding SR configuration for the triggered SR.

...

If an SR is triggered and there are no other SRs pending corresponding to the same SR configuration, the MAC entity shall set the SR_COUNTER of the corresponding SR configuration to 0.

NOTE: When reconfiguration of SR configuration occurs, all SR configurations are released (including cancellation of all pending SR(s)) and new SR configurations are configured.

FIG.9

5.4.4  Scheduling Request

The Scheduling Request (SR) is used for requesting UL-SCH resources for new transmission.

The MAC entity may be configured with zero, one, or more SR configurations. An SR configuration consists of a set of PUCCH resources for SR across different BWPs and cells. For a logical channel, at most one PUCCH resource for SR is configured per BWP.

Each SR configuration corresponds to one or more logical channels. Each logical channel may be mapped to zero or one SR configuration, which is configured by RRC. The SR configuration of the logical channel that triggered the BSR (subclause 5.4.5) (if such a configuration exists) is considered as corresponding SR configuration for the triggered SR.

...

If an SR has been triggered since the last reconfiguration of SR functionality by upper layer, or an SR is triggered and there are no other SRs pending corresponding to the same SR configuration, the MAC entity shall set the SR_COUNTER of the corresponding SR configuration to 0.

FIG.11

5.4.4   Scheduling Request

The Scheduling Request (SR) is used for requesting UL-SCH resources for new transmission.

The MAC entity may be configured with zero, one, or more SR configurations. An SR configuration consists of a set of PUCCH resources for SR across different BWPs and cells. For a logical channel, at most one PUCCH resource for SR is configured per BWP.

Each SR configuration corresponds to one or more logical channels. Each logical channel may be mapped to zero or one SR configuration, which is configured by RRC. The mapped SR configuration at the time of the logical channel that triggered the BSR (subclause 5.4.5) (if such a configuration exists) is considered as corresponding SR configuration for the triggered SR.

FIG.13

5.4.4  Scheduling Request

The Scheduling Request (SR) is used for requesting UL-SCH resources for new transmission.

The MAC entity may be configured with zero, one, or more SR configurations. An SR configuration consists of a set of PUCCH resources for SR across different BWPs and cells. For a logical channel, at most one PUCCH resource for SR is configured per BWP.

Each SR configuration corresponds to one or more logical channels. Each logical channel may be mapped to zero or one SR configuration, which is configured by RRC. The SR configuration of the logical channel that triggered the BSR (subclause 5.4.5) (if such a configuration exists) is considered as corresponding SR configuration for the triggered SR.

...

If an SR is triggered and there are no other SRs pending corresponding to the same SR configuration, the MAC entity shall set the SR_COUNTER of the corresponding SR configuration to 0.

NOTE: When multiple SRs are triggered simultaneously due to simultaneous Regular BSR triggers, those SR triggers are considered as an trigger.

FIG.14

5.4.4 Scheduling Request

The Scheduling Request (SR) is used for requesting UL-SCH resources for new transmission.

The MAC entity may be configured with zero, one, or more SR configurations. An SR configuration consists of a set of PUCCH resources for SR across different BWPs and cells. For a logical channel, at most one PUCCH resource for SR is configured per BWP.

Each SR configuration corresponds to one or more logical channels. Each logical channel may be mapped to zero or one SR configuration, which is configured by RRC. The SR configuration of the logical channel that triggered the BSR (subclause 5.4.5) (if such a configuration exists) is considered as corresponding SR configuration for the triggered SR.

RRC configures the following parameters for the scheduling request procedure:

- *sr-ProhibitTimer* (per SR configuration);
- *sr-TransMax* (per SR configuration).

The following UE variables are used for the scheduling request procedure:

- *SR_COUNTER* (per SR configuration).

If an SR is triggered and there are no other SRs pending corresponding to the same SR configuration, <u>or there are SRs pending corresponding to SR configuration without initialization of SR_COUNTER</u>, the MAC entity shall <u>initializing</u> set the *SR_COUNTER* of the corresponding SR configuration to 0.

(omit descriptions)

FIG.15

5.4.4   Scheduling Request (omit descriptions)

As long as at least one SR is pending, the MAC entity shall for each pending SR:
1> if the MAC entity has no valid PUCCH resource configured for the pending SR:
   2> initiate a Random Access procedure (see subclause 5.1) on the SpCell and cancel the pending SR.
1> else, for the SR configuration corresponding to the pending SR:
   2> when the MAC entity has an SR transmission occasion on the valid PUCCH resource for SR configured; and
   2> if sr-ProhibitTimer is not running at the time of the SR transmission occasion; and
   2> if the PUCCH resource for the SR transmission occasion does not overlap with a measurement gap; and
   2> if the PUCCH resource for the SR transmission occasion does not overlap with a UL-SCH resource:
      3> if SR_COUNTER < sr-TransMax:
         4> if SR_COUNTER is not initialized:
            5> set SR_COUNTER to 0
         4> increment SR_COUNTER by 1;
         4> instruct the physical layer to signal the SR on one valid PUCCH resource for SR;
         4> start the sr-ProhibitTimer.
      3> else:
         4> notify RRC to release PUCCH for all Serving Cells;
         4> notify RRC to release SRS for all Serving Cells;
         4> clear any configured downlink assignments and uplink grants;
         4> clear any PUSCH resources for semi-persistent CSI reporting;
         4> initiate a Random Access procedure (see subclause 5.1) on the SpCell and cancel all pending SRs.

NOTE 1: The selection of which valid PUCCH resource for SR to signal SR on when the MAC entity has more than one overlapping valid PUCCH resource for the SR transmission occasion is left to UE implementation.

NOTE 2: If more than one individual SR triggers an instruction from the MAC entity to the PHY layer to signal the SR on the same valid PUCCH resource, the SR_COUNTER for the relevant SR configuration is incremented only once.

(omit descriptions)

TERMINAL DEVICE, BASE STATION DEVICE, AND WIRELESS COMMUNICATION SYSTEM

CROSS-REFERENCE TO RELATED APPLICATION

This application is a continuation of International Application No. PCT/JP2019/005417, filed on Feb. 14, 2019 which claims the benefit of priority of the prior International Application No. PCT/JP2018/048454, filed on Dec. 28, 2018, the entire contents of which are incorporated herein by reference.

FIELD

The embodiments discussed herein are related to a terminal device, a base station device, and a wireless communication system.

BACKGROUND

In the current networks, traffic of mobile terminals (smartphones and feature phones) occupies most of network resources. Furthermore, traffic used by mobile terminals tends to be continuously increased in the future.

In contrast, with the development of Internet of things (IoT) services (for example, transportation systems, smart meters, monitoring systems for devices, and the like), there is a need to cope with services with various requirements. Thus, in the communication standards for the fifth generation mobile communication (5G or New Radio (NR)), in addition to the standard technology of the fourth generation mobile communication (4G) (for example, Non-Patent Documents 1 to 12), there is a demand for a technology that implements high-data-rate, high-capacity, and low-latency communication. Furthermore, regarding the fifth generation communication standards, technical studies are being conducted in 3GPP working groups (for example, TSG-RAN WG1, TSG-RAN WG2, and the like), and the first edition was released on December, 2017 (Non-Patent Documents 13 to 39).

As described above, in 5G, in order to deal with various kinds of services, support of a lot of use cases classified into enhanced mobile broadband (eMBB), machine type communications (Massive MTC), and ultra-reliable and low latency communication (URLLC) is conceived.

If UL data (Uplink data) that is transmitted from a terminal device to a base station device is generated, the terminal device transmits a scheduling request (SR) to the base station device. After that, if a resource is allocated by the base station device, the terminal device transmits a buffer status report (BSR) that is in accordance with amount of UL data by using the allocated resource. The base station device that has received the BSR allocates the resource for transmitting the UL data to the terminal device and transmits allocation information to the terminal device. The terminal device transmits the UL data based on the allocation information.

Furthermore, in the terminal device, an SR counter that counts a failure of the scheduling request is configured and, if the SR counter exceeds a predetermined value (set value), a radio link failure occurs. In order to avoid a frequent occurrence of a radio link failure, a condition that allows the SR counter to return to the initial value is configured.

Non-Patent Document 1: 3GPP TS 36.133 V15.3.0 (2018-06)
Non-Patent Document 2: 3GPP TS 36.211 V15.2.0 (2018-06)
Non-Patent Document 3: 3GPP TS 36.212 V15.2.1 (2018-07)
Non-Patent Document 4: 3GPP TS 36.213 V15.2.0 (2018-06)
Non-Patent Document 5: 3GPP TS 36.300 V15.2.0 (2018-06)
Non-Patent Document 6: 3GPP TS 36.321 V15.2.0 (2018-07)
Non-Patent Document 7: 3GPP TS 36.322 V15.1.0 (2018-07)
Non-Patent Document 8: 3GPP TS 36.323 V15.0.0 (2018-07)
Non-Patent Document 9: 3GPP TS 36.331 V15.2.2 (2018-06)
Non-Patent Document 10: 3GPP TS 36.413 V15.2.0 (2018-06)
Non-Patent Document 11: 3GPP TS 36.423 V15.2.0 (2018-06)
Non-Patent Document 12: 3GPP TS 36.425 V15.0.0 (2018-06)
Non-Patent Document 13: 3GPP TS 37.340 V15.2.0 (2018-06)
Non-Patent Document 14: 3GPP TS 38.201 V15.0.0 (2017-12)
Non-Patent Document 15: 3GPP TS 38.202 V15.2.0 (2018-06)
Non-Patent Document 16: 3GPP TS 38.211 V15.2.0 (2018-06)
Non-Patent Document 17: 3GPP TS 38.212 V15.2.0 (2018-06)
Non-Patent Document 18: 3GPP TS 38.213 V15.2.0 (2018-06)
Non-Patent Document 19: 3GPP TS 38.214 V15.2.0 (2018-06)
Non-Patent Document 20: 3GPP TS 38.215 V15.2.0 (2018-06)
Non-Patent Document 21: 3GPP TS 38.300 V15.2.0 (2018-06)
Non-Patent Document 22: 3GPP TS 38.321 V15.2.0 (2018-06)
Non-Patent Document 23: 3GPP TS 38.322 V15.2.0 (2018-06)
Non-Patent Document 24: 3GPP TS 38.323 V15.2.0 (2018-06)
Non-Patent Document 25: 3GPP TS 38.331 V15.2.1 (2018-06)
Non-Patent Document 26: 3GPP TS 38.401 V15.2.0 (2018-06)
Non-Patent Document 27: 3GPP TS 38.410 V15.0.0 (2018-06)
Non-Patent Document 28: 3GPP TS 38.413 V15.0.0 (2018-06)
Non-Patent Document 29: 3GPP TS 38.420 V15.0.0 (2018-06)
Non-Patent Document 30: 3GPP TS 38.423 V15.0.0 (2018-06)
Non-Patent Document 31: 3GPP TS 38.470 V15.2.0 (2018-06)
Non-Patent Document 32: 3GPP TS 38.473 V15.2.1 (2018-07)
Non-Patent Document 33: 3GPP TR 38.801 V14.0.0 (2017-03)

Non-Patent Document 34: 3GPP TR 38.802 V14.2.0 (2017-09)

Non-Patent Document 35: 3GPP TR 38.803 V14.2.0 (2017-09)

Non-Patent Document 36: 3GPP TR 38.804 V14.0.0 (2017-03)

Non-Patent Document 37: 3GPP TR 38.900 V15.0.0 (2018-06)

Non-Patent Document 38: 3GPP TR 38.912 V15.0.0 (2018-06)

Non-Patent Document 39: 3GPP TR 38.913 V15.0.0 (2018-06)

At present, in the 3GPP meeting, additions and studies of new descriptions are being conducted in order to cope with various use cases in 5G. However, with the current count method of the SR counter, operations with respect to the descriptions that have been newly added and the descriptions that are being studied are insufficient. Namely, there is a problem in that the condition for initializing the SR counter to the initial value is unclear and there is a case in which whether a count of a scheduling request is to be continued or an SR counter is to be initialized is uncertain.

SUMMARY

According to an aspect of an embodiment, a terminal device transmits a scheduling request to a base station device. The terminal device includes: a receiver configured to receive a signal including configuration information related to a scheduling request configuration associated with a logical channel; and a controller configured to control a counter associated with the scheduling request configuration. The controller controls, when the receiver receives a signal including configuration information related to a reconfiguration of the scheduling request configuration, the counter in accordance with at least one of the scheduling request configuration after the reconfiguration and a state of the scheduling request.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a flowchart illustrating an operation of a scheduling request according to the first embodiment;

FIG. 4 is a sequence diagram illustrating a specific example of controlling an SR counter;

FIG. 5 is a diagram illustrating an example of description of a standard specification;

FIG. 7 is a diagram illustrating another example of description of a standard specification;

FIG. 8 is a diagram illustrating still another example of description of a standard specification;

FIG. 9 is a diagram illustrating still another example of description of a standard specification;

FIG. 11 is a diagram illustrating still another example of description of a standard specification;

FIG. 13 is a diagram illustrating an example of description of a standard specification;

FIG. 14 is a diagram illustrating an example of description of a standard specification; and FIG. 15 is a diagram illustrating still another example of description of a standard specification.

DESCRIPTION OF EMBODIMENTS

Preferred embodiments of the present invention will be explained with reference to accompanying drawings. Furthermore, the present invention is not limited to the embodiments.

[a] First Embodiment

A wireless communication system according to a first embodiment includes a terminal device 100 and a base station device 200. The terminal device 100 transmits uplink (UL) data from the terminal device 100 to the base station device 200. At this time, when UL data to be transmitted is generated, the terminal device 100 uses this state as a trigger for transmission of a buffer status report (BSR) and activates (triggers), if a trigger for transmission of a BSR occurs, transmission of a scheduling request (SR). Then, when the terminal device 100 receives an UL grant from the base station device 200 as a response to the SR, the terminal device 100 transmits the BSR by using the resource allocated by the UL grant. After that, the terminal device 100 further receives an UL grant from the base station device 200 and transmits the UL data by using the resource allocated by this UL grant.

The number of transmissions of the SR after the trigger of the transmission of the SR is counted by an SR counter and, if the number of transmissions of the SR reaches a predetermined number of times before a predetermined SR completion condition is satisfied, an occurrence of a radio link failure is detected. The SR counter is sometimes provided for each configuration related to an SR transmission (SR configuration). Namely, different SR configurations are configured in accordance with, for example, the Quality of Service (QoS) of the UL data and, in some cases, an SR counter is provided for each SR configuration.

Incidentally, it is conceivable that an SR configuration is changed while transmission of the SR is continued. Specifically, for example, when the terminal device 100 performs a multiple access that simultaneously accesses a plurality of base station devices, if a group of cells (cell group: CG) to be connected is reconfigured such that a medium access control (MAC) layer is not initialized (reset), in some cases, the SR configuration is also reconfigured in accordance with the reconfiguration of the CG. In this case, at present, there is no clear description of an operation of an SR counter for each SR configuration, and a protocol error may possibly occur. Thus, in the first embodiment, a case of preventing a protocol error when the SR configuration is changed will be described.

Figure 1:
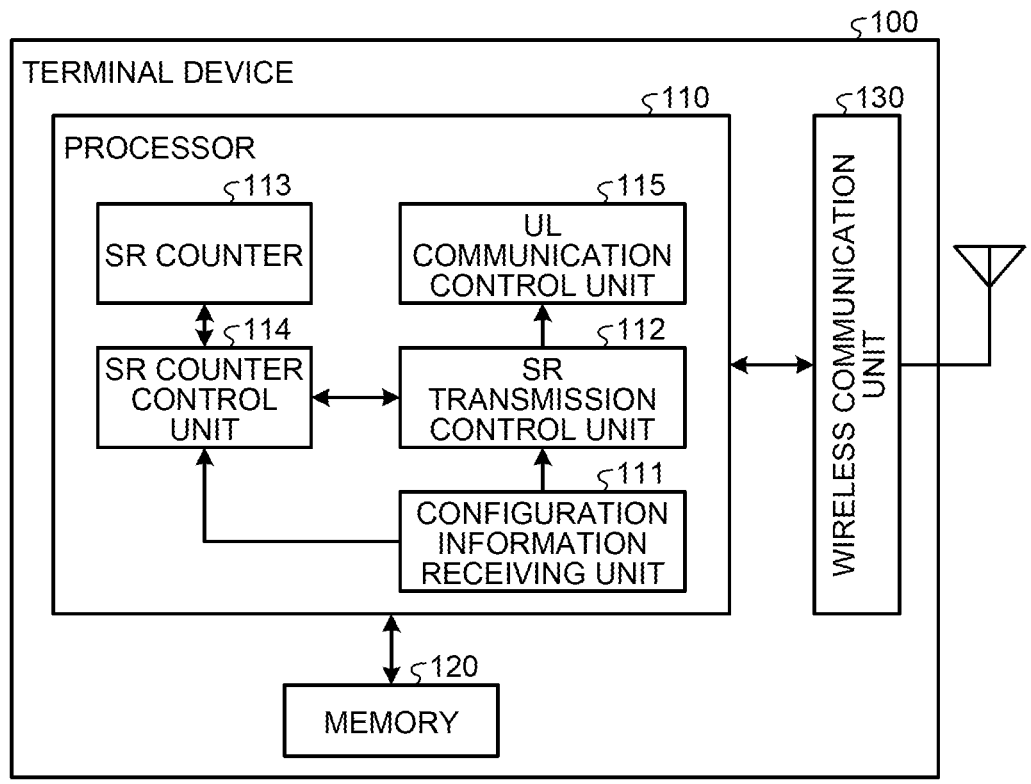
FIG. 1 is a block diagram illustrating a terminal device according to a first embodiment.

FIG. 1 is a block diagram illustrating a configuration of the terminal device 100 according to the first embodiment.

The terminal device 100 illustrated in FIG. 1 includes a processor 110, a memory 120, and a wireless communication unit 130.

The processor 110 includes, for example, a central processing unit (CPU), a field programmable gate array (FPGA) or a digital signal processor (DSP), and performs overall control of the terminal device 100. Specifically, the processor 110 includes a configuration information receiving unit 111, an SR transmission control unit 112, an SR counter 113, an SR counter control unit 114 and an UL communication control unit 115.

The configuration information receiving unit 111 receives configuration information related to the SR configuration via the wireless communication unit 130. Specifically, the configuration information receiving unit 111 receives the configuration information including a parameter of, for example, the upper limit of the number of transmissions of an SR for each SR configuration. Furthermore, the configuration information receiving unit 111 receives the configuration information indicating an association relationship between UL data and an SR configuration. Namely, the configuration information receiving unit 111 receives the configuration information indicating which SR configuration is to be used to transmit an SR of UL data. Furthermore, the configuration information receiving unit 111 receives the configuration information transmitted from the base station device 200 by, for example, radio resource control (RRC).

When UL data to be transmitted is generated, the SR transmission control unit 112 transmits, via the wireless communication unit 130, an SR that requests scheduling of a transmission of the UL data. At this time, the SR transmission control unit 112 transmits the SR in accordance with the SR configuration associated with the UL data. For example, the SR transmission control unit 112 transmits the SR in accordance with the SR configuration associated with the QoS of the UL data. Therefore, for example, if a plurality of pieces of UL data with the same QoS class are generated, the SR transmission control unit 112 may collectively transmit a single SR with respect to these pieces of UL data. Then, the SR transmission control unit 112 repeatedly transmits the SR until a predetermined SR completion condition is satisfied. Furthermore, the SR transmission control unit 112 transmits the SR by using, for example, a physical uplink control channel (PUCCH).

The SR counter 113 counts the number of transmissions of the SR for each SR configuration. Namely, because the SR is repeatedly transmitted until the predetermined SR completion condition is satisfied, the SR counter 113 counts the number of transmissions of the SR. The SR counter 113 initializes the number of counting times in each of the SR configurations in accordance with the control of the SR counter control unit 114.

The SR counter control unit 114 controls the number of counting times for each SR configuration in the SR counter 113. Specifically, if transmission of an SR based on one of the SR configurations is triggered by the SR transmission control unit 112, the SR counter control unit 114 initializes the number of counting times of the corresponding SR configuration to zero. Then, if the SR is transmitted by the SR transmission control unit 112, the SR counter control unit 114 increments, in the SR counter 113, the number of counting times of the SR configuration to which the transmitted SR belongs. Furthermore, if configuration information indicating a reconfiguration of the SR configuration is received by the configuration information receiving unit 111, the SR counter control unit 114 controls the number of counting times for each SR configuration. Namely, when the SR configuration is changed, the SR counter control unit 114 performs control whether the number of counting times for each SR configuration is to be continued or initialized.

The UL communication control unit 115 performs control of uplink (UL) communication from the terminal device 100 to the base station device 200. Specifically, as a response to the SR transmitted by the SR transmission control unit 112, the UL communication control unit 115 receives, via the wireless communication unit 130, the UL grant transmitted from the base station device 200. Then, the UL communication control unit 115 transmits, via the wireless communication unit 130, a BSR indicating an amount of retaining UL data in a buffer by using the resource that is allocated by the UL grant. After that, the UL communication control unit 115 receives the UL grant transmitted from the base station device 200 as the result of the scheduling based on the BSR, and then, transmits the UL data by using the resource that is allocated by the UL grant. Note that the UL communication control unit 115 transmits the BSR by using, for example, a physical uplink shared channel (PUSCH) and transmits the UL data by using the PUSCH.

The memory 120 includes, for example, a random access memory (RAM) or a read only memory (ROM) and stores information that is used by the processor 110 to perform the process.

The wireless communication unit 130 performs a wireless transmission process of, for example, digital/analog (D/A) conversion and up-conversion on the SR, the BSR, and the UL data output from the processor 110 and wirelessly transmits the processed data via an antenna. Furthermore, the wireless communication unit 130 performs a wireless reception process of, for example, down-conversion and analog/digital (A/D) conversion on the reception data wirelessly received via the antenna and outputs the processed data to the processor 110. The reception data received by the wireless communication unit 130 includes, for example, configuration information and an UL grant.

Figure 2:
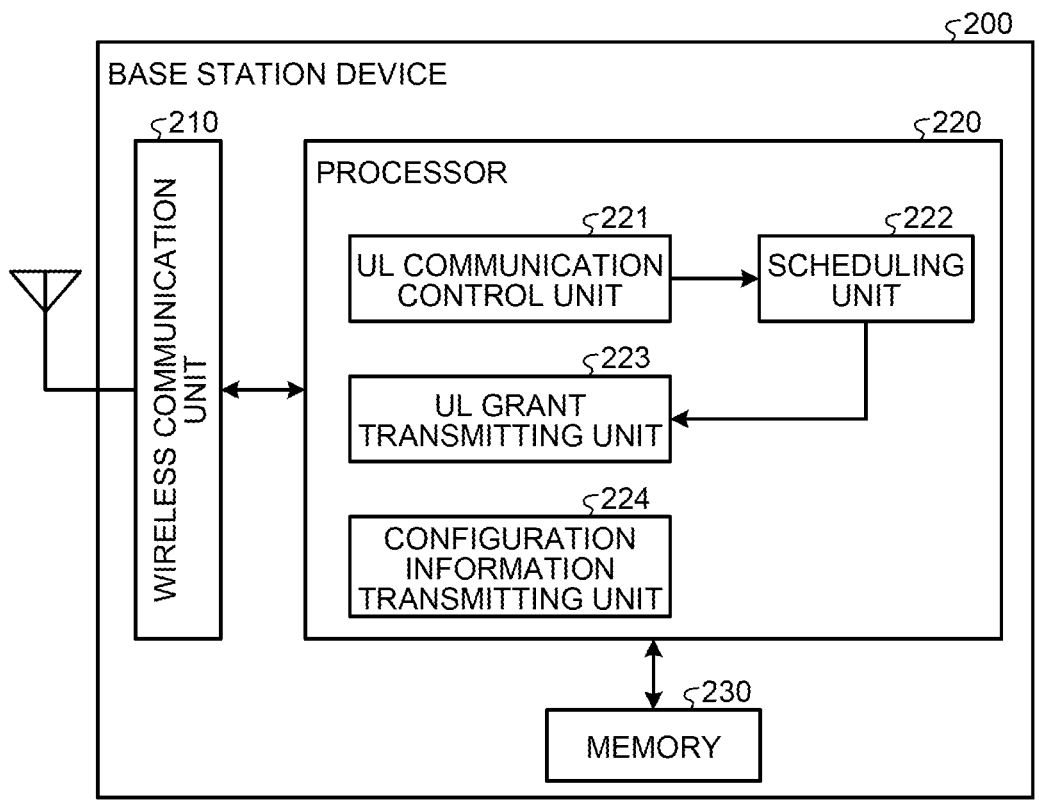
FIG. 2 is a block diagram illustrating a configuration of a base station device according to the first embodiment.

FIG. 2 is a block diagram illustrating a configuration of the base station device 200 according to the first embodiment. The base station device 200 illustrated in FIG. 2 includes a wireless communication unit 210, a processor 220, and a memory 230.

The wireless communication unit 210 receives a signal via the antenna and performs a predetermined reception process, such as down-conversion and A/D conversion, on the reception signal. Furthermore, the wireless communication unit 210 performs a predetermined wireless transmission process, such as D/A conversion and up-conversion, on the transmission signal output from the processor 220 and transmits the processed data via the antenna.

The processor 220 includes, for example, a CPU, an FPGA, or a DSP and performs overall control of the base station device 200. Specifically, the processor 220 includes an UL communication control unit 221, a scheduling unit 222, an UL grant transmitting unit 223, and a configuration information transmitting unit 224.

The UL communication control unit 221 receives an UL signal transmitted from the terminal device 100 via the wireless communication unit 210 and performs demodulation and decoding on the reception signal. The UL signal received by the UL communication control unit 221 includes the SR, the BSR, and the UL data transmitted from the terminal device 100.

When the SR transmitted from the terminal device 100 is received by the UL communication control unit 221, the scheduling unit 222 decides the resource that is used to transmit the BSR by the terminal device 100 and notifies the UL grant transmitting unit 223 of the decided resource. Furthermore, when the BSR transmitted from the terminal device 100 is received by the UL communication control unit 221, the scheduling unit 222 decides the resource that is used to transmit the UL data by the terminal device 100 and notifies the UL grant transmitting unit 223 of the decided resource.

When the resource for transmitting the BSR is notified from the scheduling unit 222, the UL grant transmitting unit 223 generates an UL grant indicating permission of transmission of the BSR by using the resource and transmits the generated UL grant to the terminal device 100 via the wireless communication unit 210. Furthermore, when the resource for UL data transmission is notified from the scheduling unit 222, the UL grant transmitting unit 223 generates an UL grant indicating permission of transmission of the UL data by using the resource and transmits the generated UL grant to the terminal device 100 via the wireless communication unit 210.

The configuration information transmitting unit 224 transmits configuration information related to an SR configuration via the wireless communication unit 210. For example, when the association relationship between the QoS of the UL data and the SR configuration has been changed, the configuration information transmitting unit 224 transmits configuration information indicating the association relationship between the UL data and the SR configuration. Furthermore, for example, when the terminal device 100 reconfigures the CG to be connected without initialization of MAC layer, the configuration information transmitting unit 224 transmits the configuration information that is used to reconfigure the SR configuration in accordance with the reconfiguration of the CG.

In the following, an operation of the scheduling request performed in the wireless communication system having the above described configuration will be described with reference to the flowchart illustrated in FIG. 3. In a description below, a description will be mainly given of an operation of the terminal device 100 when UL data to be transmitted is generated.

In the terminal device 100, generation of UL data to be transmitted is a trigger for a transmission of the BSR (Step S101). Accordingly, a scheduling request for a transmission of the UL data is triggered by the SR transmission control unit 112 (Step S102). At this time, by referring to the configuration information by the SR transmission control unit 112, for example, an SR associated with an SR configuration in accordance with the QoS of the UL data is triggered. Then, the number of counting times of the SR configuration to which the triggered SR belongs is initialized in the SR counter 113 by the SR counter control unit 114 (Step S103). Namely, the number of SR transmissions of the SR configuration to which the triggered SR belongs is configured to zero that is the initial value by the SR counter control unit 114.

However, in this SR configuration, if the number of SR transmissions related to the other piece of UL data is already being counted (SR pending), the number of counting times of the subject SR configuration in the SR counter 113 is not initialized and the number of transmissions of the SR is continuously counted. Here, a description will be given with the assumption that the number of SR transmissions related to the other piece of UL data is not being counted and the above described triggered SR is the first triggered SR in the SR configuration.

When the number of counting times in the SR counter 113 is initialized, a transmission of the SR is started by the SR transmission control unit 112. Namely, the SR is transmitted from the wireless communication unit 130 to the base station device 200. When the SR is transmitted, the SR counter 113 is incremented by the SR counter control unit 114 and the number of transmissions of the SR is counted (Step S104). Because the SR is repeatedly transmitted until the predetermined SR completion condition is satisfied, the SR counter 113 is incremented by the SR counter control unit 114 every time an SR is transmitted. The predetermined SR completion condition is, for example, the completion of the transmission of the UL data.

Incidentally, when the SR configuration is changed, the configuration information is received by the configuration information receiving unit 111 even in the middle of repeatedly transmitting the SR, and then, the SR configuration is reconfigured (Step S105). Namely, in some cases, a transmission of the SR is continued with the SR configuration that is different from the SR configuration at the time the SR is triggered. In this case, the SR associated with a reconfigured SR configuration is transmitted by the SR transmission control unit 112. Furthermore, the number of counting times for each SR configuration in the SR counter 113 is controlled by the SR counter control unit 114 (Step S106). Specifically, the SR counter 113 is controlled by the SR counter control unit 114 according to at least one of the reconfigured SR configuration and the number of transmissions of the SR before the reconfiguration.

In the following, a specific example of control of the SR counter 113 in a case in which the SR configuration is reconfigured will be described. FIG. 4 is a sequence diagram illustrating a first specific example of the SR counter 113.

If the SR configuration associated with the UL data is, for example, an SR configuration #1, the SR is transmitted by the SR transmission control unit 112 in accordance with the SR configuration #1 (Step S201). Then, the SR is repeatedly transmitted by the SR transmission control unit 112 until the predetermined SR completion condition is satisfied (Step S202). At this time, in the SR counter 113, the number of counting times associated with the SR configuration #1 is incremented every time the SR is transmitted and the number of transmissions of the SR is counted.

If the SR configuration is changed while the transmission of the SR is repeated, the configuration information that instructs to reconfigure the SR configuration is transmitted from the base station device 200 (Step S203). The configuration information is received by the configuration information receiving unit 111 included in the terminal device 100 and the SR configuration is reconfigured. Here, it is assumed that the SR configuration to which the SR that is triggered by a logical channel (LCH) mapped onto the SR configuration and that is being transmitted (or, during SR pending) belongs is changed from the SR configuration #1 to an SR configuration #2.

In this case, in the first specific example, a count number of the SR counter 113 is continued (Step S204). Namely, because the MAC initialization is not performed, the count is not also initialized and continued. In other words, the count number in the SR configuration #1 that is before the reconfiguration is taken over as the count number in the SR configuration #2 that is after the reconfiguration. Then, after the reconfiguration of the SR configuration, the SR is transmitted by the SR transmission control unit 112 in accordance with the SR configuration #2 that is after the reconfiguration (Step S205). In the first specific example, because the count number of the SR counter 113 is continued, for example, if the number of SR transmissions in the SR configuration #1 is X times, the number of SR transmissions in the SR configuration #2 is counted starting from (X+1) times.

In this way, the SR counter control unit 114 performs control such that the count number of the SR counter 113 is continued even when SR configuration is reconfigured, and thus it is possible to consistently count the number of transmissions of the SR triggered by a single piece of UL data that arrives a certain LCH. Thus, for example, it is possible to perform control such that transmission delay of the UL data is within an appropriate range. Note that, if the SR counter 113 is controlled as in the first specific example, subclause 5.4.4 in TS 38.321 that is 3GPP standard specification can be revised to that indicated in, for example, FIG. 5. In this example, it is prescribed that SR counter is continued as long as a certain LCH is mapped onto the SR configuration.

Figure 6:
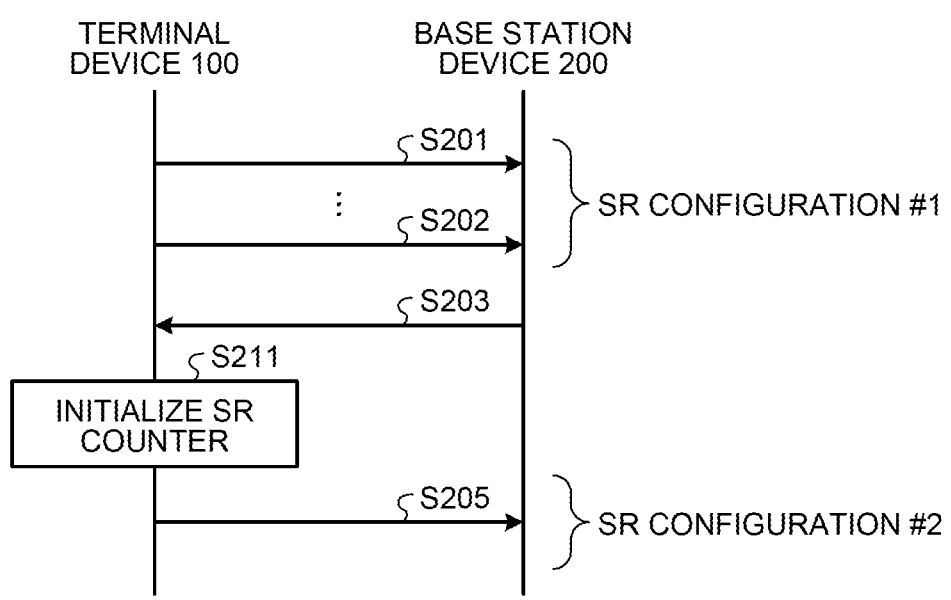
FIG. 6 is a sequence diagram illustrating another specific example of controlling the SR counter.

FIG. 6 is a sequence diagram illustrating a second specific example of controlling the SR counter 113. In FIG. 6, components that are the same as those illustrated in FIG. 4 are assigned the same reference numerals and descriptions thereof will be omitted.

In the second specific example, if the SR configuration is reconfigured, in all of the SR configurations, the number of SR transmissions is again counted from the initial value. Namely, although MAC initialization is not performed, the count is initialized because the SR configuration is reconfigured. In other words, the SR belonging to all of the SR configurations is canceled and the SR counter 113 is initialized (Step S211). Consequently, the number of counting times of the SR configuration #2 that is after the reconfiguration is also initialized and the number of SR transmissions of the SR configuration #2 becomes, for example, zero that is the initial value. Then, if the SR is transmitted in accordance with the SR configuration #2 after the reconfiguration of the SR configuration (Step S205), the number of SR transmissions in the SR configuration #2 is counted starting from one.

In this way, by performing control by the SR counter control unit 114 such that the SR counter 113 is initialized when the SR configuration is reconfigured, it is possible to reduce a possibility of an occurrence of a radio link failure due to the number of counting times reaching the upper limit and it is thus possible to facilitate continuation of communication. Furthermore, when the SR counter 113 is controlled as in the second specific example, subclause 5.4.4 in TS 38.321 that is the 3GPP standard specification can be revised to that indicated in, for example, FIGS. 7 to 9.

In FIG. 7, it is prescribed that, if a reconfiguration of the SR configuration occurs, all of the triggered SRs are canceled. Furthermore, in FIG. 8, it is prescribed that, in addition to the cancellation of the SRs, all of the SR configurations are newly configured. In contrast, in FIG. 9, it is not prescribed that an SR is canceled or an SR configuration is new but it is only prescribed that, if an SR is triggered after a reconfiguration of the SR configuration, an SR counter is initialized.

Figure 10:
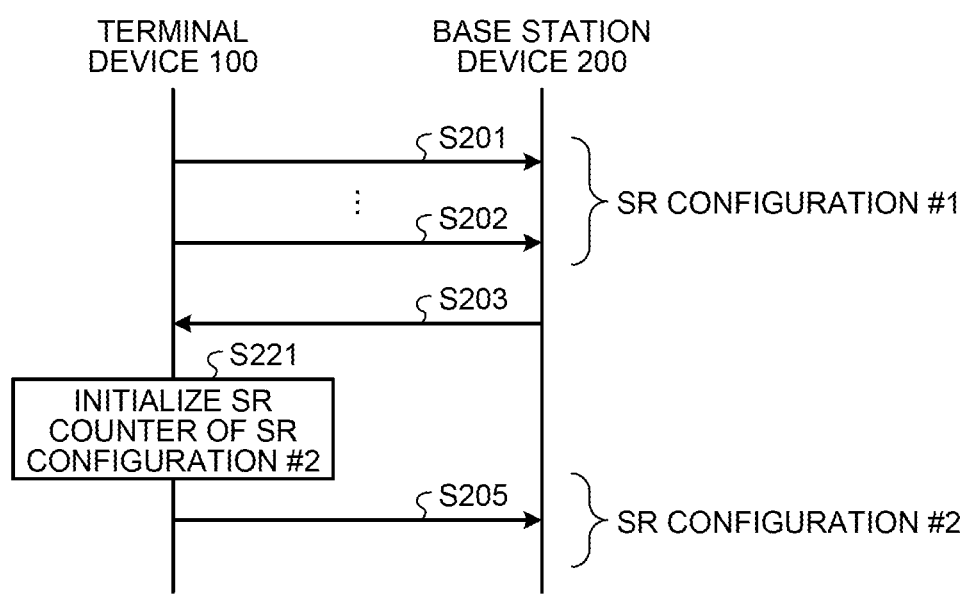
FIG. 10 is a sequence diagram illustrating still another specific example of controlling the SR counter.

FIG. 10 is a sequence diagram illustrating a third specific example of controlling the SR counter 113. In FIG. 10, components that are the same as those illustrated in FIG. 4 are assigned the same reference numerals and descriptions thereof will be omitted.

In the third specific example, if the SR configuration is reconfigured, the number of SR transmissions in the reconfigured SR configuration is again counted starting from the initial value. In contrast, the counting of the SR configuration that is not reconfigured is continued without being initialized. Namely, the third specific example is an intermediate SR configuration method between the first specific example and the second specific example. In the third specific example, the SR belonging to the SR configuration #2 is canceled and the number of counting times of the SR configuration #2 is initialized in the SR counter 113 (Step S221). Consequently, the number of SR transmissions of the SR configuration #2 becomes, for example, zero that is the initial value. Then, if the SR is transmitted in accordance with the SR configuration #2 after the reconfiguration of the SR configuration (Step S205), the number of SR transmissions in the SR configuration #2 is counted from one. However, at this time, the SR belonging to the SR configuration other than the SR configuration #2 is not canceled and the count number of the SR configuration other than the SR configuration #2 is continued in the SR counter 113.

In this way, by performing control by the SR counter control unit 114 such that the number of counting times of the reconfigured SR configuration in the SR counter 113 is initialized when the SR configuration is reconfigured, it is possible to reduce a possibility of an occurrence of a radio link failure due to the number of counting times reaching the upper limit and it is thus possible to facilitate continuation of communication. Furthermore, regarding the other SR configurations, it is possible to consistently count the number of transmissions of the SR without being affected by a reconfiguration of the SR configuration. Note that, if the SR counter 113 is controlled as in the third specific example, subclause 5.4.4 in TS 38.321 that is 3GPP standard specification can be revised to that indicated in, for example, FIG. 11. In FIG. 11, the original SR configuration that is before a reconfiguration of the CG in the LCH that triggers the BSR is defined to be the SR configuration. Accordingly, if a reconfiguration of the CG occurs and the original SR configuration is changed, the SR triggered by the subject LCH is invalid. Because the SR becomes invalid, the SR counter is initialized in accordance with a trigger of a new SR. In contrast, if the original SR configuration is not changed, the SR triggered by the subject LCH is continuously valid. Because the SR is continued, the SR counter is not initialized even if the SR is newly triggered.

As described above, according to the embodiment, when the SR configuration related to the SR of the UL data is reconfigured, control is performed such that a count of the number of SR transmissions in the SR counter is continued or the count thereof is initialized. Accordingly, an operation of the SR counter at the time of reconfiguration of the SR configuration is clear and it is thus possible to avoid an occurrence of protocol error. In other words, if it possible to appropriately operates the SR counter.

Note that, in the first embodiment described above, it is assumed that, when the CG connected by the terminal device 100 is reconfigured without initialization of the MAC layer, the SR configuration is also reconfigured in accordance with the reconfiguration of the CG. However, it may also be possible that, even when the CG is reconfigured, the SR configuration is not reconfigured by limiting an operation of the base station device 200. Namely, it may also be possible that, even when a CG configuration is reconfigured, configuration information is not transmitted from the configuration information transmitting unit 224 in the base station device 200. By doing so, there is no reconfiguration of an SR configuration associated with a reconfiguration of the CG configuration and an operation of the SR counter 113 is not affected.

[b] Second Embodiment

Similarly to the first embodiment, a wireless communication system according to a second embodiment includes the terminal device 100 and the base station device 200. The configurations of the terminal device 100 and the base station device 200 according to the second embodiment are the same as those in the first embodiment; descriptions thereof will be omitted.

Incidentally, it is prescribed that the SR counter that counts the number of transmissions of the SR is initialized when a single SR is triggered and another SR in the same SR configuration is not triggered. However, it is conceivable that a plurality of SRs are simultaneously triggered, for example, in a case in which the same UL data is transmitted in a plurality of logical channels at the same time. In this case, as present, there is no clear descriptions of initialization of the SR counter and thus a protocol error may possibly occur. Accordingly, in the second embodiment, a description will be given of a case of preventing a protocol error in a case in which a plurality of SRs are simultaneously triggered.

In the second embodiment, even when transmissions of a plurality of SRs associated with one of SR configurations are simultaneously triggered by the SR transmission control unit 112, the SR counter control unit 114 initializes the number of counting times of the subject SR configuration to zero. Namely, for example, if UL data to be transmitted is generated in a plurality of logical channels and the SR associated with the same SR configuration is triggered in each of the plurality of logical channels, the SR counter control unit 114 configures the number of counting times of the subject SR configuration to zero that is the initial value.

Figure 12:
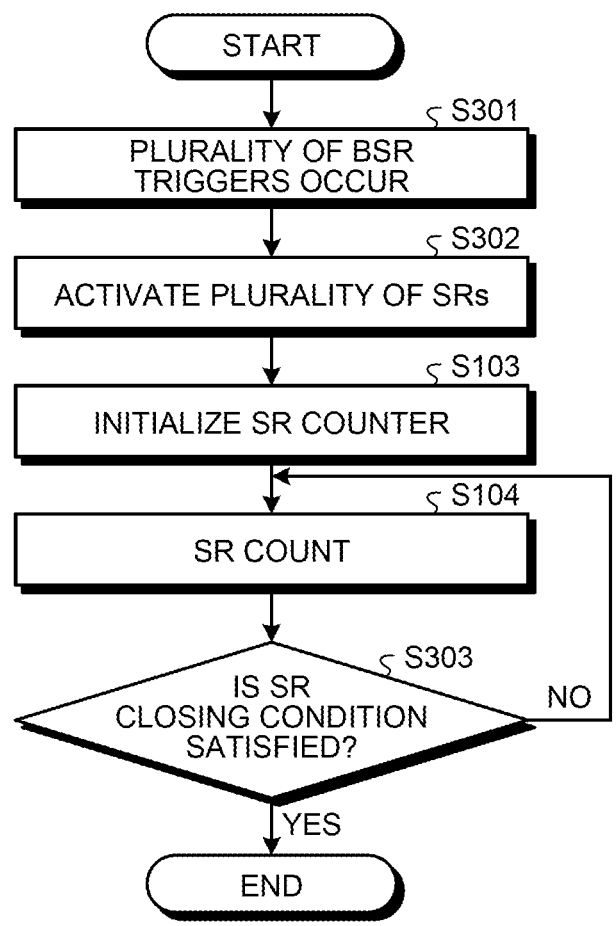
FIG. 12 is a flowchart illustrating a scheduling request according to a second embodiment.

In the following, an operation of a scheduling request in the wireless communication system having the above described configuration will be described with reference to the flowchart illustrated in FIG. 12. In FIG. 12, components that are the same as those illustrated in FIG. 3 are assigned the same reference numerals and descriptions thereof will be omitted. In a description below, a description will be mainly given of an operation of the terminal device 100 when UL data to be transmitted is generated.

In the terminal device 100, generation of UL data to be transmitted is a trigger for transmission of the BSR. At this time, if the UL data is to be transmitted by, for example, a plurality of logical channels, triggers for transmissions of a plurality of BSRs simultaneously occur (Step S301). Accordingly, a plurality of scheduling requests for transmission of the UL data are triggered by the SR transmission control unit 112 (Step S302). Then, the number of counting times of the SR configuration in which the triggered SRs belong is initialized in the SR counter 113 by the SR counter control unit 114 (Step S103). Note that it is assumed that the plurality of simultaneously triggered SRs belong to the same SR configuration.

When the number of counting times in the SR counter 113 is initialized, a transmission of the SR is started by the SR transmission control unit 112. Namely, the SR is transmitted from the wireless communication unit 130 to the base station device 200. Here, because the plurality of SRs that are simultaneously triggered belong to the same SR configuration, the SRs are collectively transmitted as a single SR. When the SR is transmitted, the SR counter 113 is incremented by the SR counter control unit 114 and the number of transmissions of the SR is counted (Step S104).

Then, it is judged, by the SR transmission control unit 112, whether the predetermined SR completion condition is satisfied (Step S303), and if the predetermined SR completion condition is not satisfied (No at Step S303), transmission of the SR and a count of the number of SR transmissions are repeated. Furthermore, if the predetermined SR completion condition is satisfied (Yes at Step S303), the scheduling request has been completed.

In this way, by performing control by the SR counter control unit 114 such that the SR counter 113 is initialized even when the plurality of SRs are simultaneously triggered, it is possible to correctly count the number of transmissions of the SR. Note that, in a case in which the SR counter 113 is controlled as described in the embodiment, for example, subclause 5.4.4 in TS 38.321 that is 3GPP standard specification can be revised to that indicated in FIG. 13.

As described above, according to the embodiment, when the plurality of SRs belonging to the same SR configuration are simultaneously triggered, control is performed such that the SR counter is initialized by treating these SRs as a single SR. Accordingly, an operation of the SR counter in a case in which a plurality of SRs are simultaneously triggered is clear and it is thus possible to prevent an occurrence of protocol error. In other words, it is possible to appropriately operate the SR counter.

Note that the first and the second embodiments can be implemented in combination. Namely, when a plurality of SRs are simultaneously triggered, the SR counter 113 is initialized by treating these SRs as a single SR, and then, if the SR configuration is reconfigured, the SR counter 113 may also be controlled in accordance with at least one of the reconfigured SR configuration and the number of transmissions of the SR before the reconfiguration.

[c] Third Embodiment

Similarly to the first embodiment and the second embodiment, a wireless communication system according to a third embodiment includes the terminal device 100 and the base station device 200. The configurations of the terminal device 100 and the base station device 200 according to the third embodiment are the same as those in the first embodiment and the second embodiment; therefore, descriptions thereof will be omitted.

Incidentally, it is conceivable that an SR configuration is changed while transmission of an SR is continued. Specifically, for example, when the terminal device 100 performs a multiple access that simultaneously accesses a plurality of the base station devices 200, there may be a case in which a group of cells (cell group: CG) to be connected is reconfigured without initialization (reset) of a medium access control (MAC) layer. In this case, the SR configuration is sometimes reconfigured in accordance with the reconfiguration of the CG. In this case, at present, there is no clear descriptions of an operation of the SR counter for each SR configuration, and a protocol error may possibly occur.

For example, the initial value of the SR counter 113 is configured in accordance with the operating system mounted on the terminal device 100. Accordingly, there is a possibility that the initial value of the SR counter 113 is not zero. If the initial value of the SR counter 113 is not zero, because the number of transmissions of the SR does not match the value of the SR counter 113, the number of times of SR is not correctly counted. Consequently, a radio link failure is not correctly determined. Furthermore, here, an example of the initial value of the SR counter 113 is described; however, there may be a case in which the SR counter 113 is not zero at the time of change in SR configuration other than the initial value. Therefore, in the third embodiment, similarly to the other embodiments, a description will be given of a case of preventing a protocol error when an SR configuration is changed.

In the third embodiment, when transmission of an SR based on one of the SR configurations is triggered by the SR transmission control unit 112 and when the SR configuration is reconfigured while the number of transmissions of the subject SR is already being counted (SR pending), if the number of SR transmissions of the other piece of UL data is already being count (SR pending), the SR counter control unit 114 does not initialize the number of counting times of the subject SR configuration in the SR counter 113. In contrast, if the number of SR transmissions related to the other piece of UL data is not being counted, the number of counting times of the subject SR configuration in the SR counter 113 is initialized (configure the value of the SR counter 113 to zero). Namely, whether or not transmission of the SR is being counted (SR pending) is the condition for initialization of the number of counting times in the SR counter 113.

In the following, regarding an operation of a request for the scheduling request performed in the wireless communication system having the above described configuration, only a difference with the first embodiment will be described with reference to FIG. 3 that has been used in the first embodiment.

When the SR configuration is changed (reconfigured) at Step S105, a transmission of the SR is sometimes continued with the SR configuration that is different from the SR configuration at the time the SR is triggered. In this case, control is performed, by the SR transmission control unit 112, such that the SR is transmitted by the reconfigured SR configuration. Furthermore, the number of counting times of the SR configuration in the SR counter 113 is controlled by the SR counter control unit 114 (Step S106). Specifically, if the number of SR transmissions related to the other piece of UL data associated with the subject SR configuration is already being counted (SR pending) by the SR counter control unit 114, the number of counting times of the subject SR configuration in the SR counter 113 is not initialized. In contrast, if the number of SR transmissions related to the other piece of UL data is not being counted, the number of counting times of the subject SR configuration in the SR counter 113 is initialized.

Note that subclause 5.4.4 in TS 38.321 that is 3GPP standard specification can be revised to that indicated in, for example, FIG. 14 or FIG. 15. In FIG. 14, the process at Step S106 according to the embodiment is prescribed by revising the descriptions related to the initialization of the SR counter. In FIG. 15, the process at Step S106 according to the embodiment is prescribed by revising the descriptions related to the number of times of control of the SR counter.

As described above, according to the embodiment, when the SR configuration related to the SR of the UL data is reconfigured, in accordance with the SR counter of the subject SR and the counter of the number of SR transmissions related to the other piece of UL data associated with the reconfigured SR configuration, control is performed such that a count of the number of SR transmissions is continued or a count is initialized. Accordingly, an operation of the SR counter at the time of reconfiguration of the SR configuration becomes clear and it is thus possible to avoid an occurrence of protocol error. In other words, it is possible to appropriately operate the SR counter. Consequently, it is possible to correctly determine a radio link failure.

Furthermore, it is possible to implement the third embodiment and the first embodiment in combination. For example, the SR counter control unit 114 controls the SR counter 113 in accordance with the value of the SR counter 113 obtained before and after the SR configuration. Specifically, when the SR that is being transmitted (or during SR pending) is changed from the SR configuration #1 to the SR configuration #2, the SR counter control unit 114 may also perform control such that the number of counting times having a greater value (or, a smaller value) between the SR configuration #1 and the SR configuration #2 is set to the number of counting times of the SR.

Furthermore, as another specific example in combination with the first embodiment, when the SR that is being transmitted (or during SR pending) is changed from the SR configuration #1 to the SR configuration #2, the SR counter control unit 114 initializes the number of counting times of the SR with respect to the SR configuration #1 and may also perform control described in the third embodiment in accordance with whether or not the SR transmission is being counted (SR pending) in the SR configuration #2 regarding the number of counting times with respect to the SR configuration #2.

Furthermore, it is possible to implement the third embodiment in combination with the second embodiment. For example, when a plurality of SRs are simultaneously triggered, the SR counter 113 is initialized by treating these SRs as a single SR, and then, if the SR configuration is reconfigured, it may also be possible to control the number of counting times in the SR counter 113 in accordance with whether or not an SR transmission is being counted (SR pending) in the reconfigured SR configuration.

Furthermore, it may also be possible to implements the first to the third embodiments in combination. For example, it is possible to use the specific examples described above in combination.

As described above, according to each of the embodiment, an operation of the SR counter at the time of reconfiguration of the SR configuration becomes clear and it is possible to avoid an occurrence of protocol error. In other words, it is possible to appropriately operate the SR counter.

According to an aspect of an embodiment of the terminal device, the base station device, and the wireless communication system disclosed in the present invention, an advantage is provided in that it is possible to appropriately operate the SR counter.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A terminal device that transmits a scheduling request to a base station device, the terminal device comprising:
    a receiver configured to receive a signal including configuration information related to a scheduling request configuration associated with a logical channel; and
    controller circuitry configured to;
       control a counter associated with the scheduling request configuration, and
       cause, when the receiver receives a signal including configuration information related to a reconfiguration of a first scheduling request configuration during counting a number of transmissions in the first scheduling request configuration, the counter associated with a second scheduling request configuration after the reconfiguration, to:
   take over as the counted number of transmissions in the first scheduling request configuration, and
   count a number of transmissions in the second scheduling request configuration, continuously from the taken-over counted number of transmissions in the first scheduling request configuration.

2. The terminal device according to claim 1, wherein, when the receiver receives the signal including the configuration information related to the reconfiguration of the scheduling request configuration, the controller circuitry initializes all counters associated with corresponding scheduling request configurations.

3. The terminal device according to claim 2, wherein the controller circuitry initializes all the counters by setting zero that is an initial value into the counter.

4. The terminal device according to claim 1, wherein, when the receiver receives the signal including the configuration information related to the reconfiguration of the scheduling request configuration, the controller circuitry initializes only a counter associated with the scheduling request configuration after the reconfiguration from among a plurality of counters associated with a plurality of corresponding scheduling request configurations.

5. The terminal device according to claim 4, wherein the controller circuitry initializes the counter by setting zero that is an initial value into the counter.

6. The terminal device according to claim 1, wherein, when a plurality of scheduling requests belonging to a single scheduling request configuration are simultaneously triggered, the controller circuitry initializes a counter associated with the single scheduling request configuration.

7. The terminal device according to claim 6, wherein the controller circuitry initializes the counter by setting zero that is an initial value into the counter.

8. The terminal device according to claim 1, wherein, when the receiver receives the signal including the configuration information related to the reconfiguration of the scheduling request configuration, the controller circuitry initializes the counter when a scheduling request transmission is not being counted in the scheduling request configuration after the reconfiguration.

9. The terminal device according to claim 1, wherein the controller circuitry is further configured to cause, when the receiver receives the signal, the counter to not initialize the counted number of transmissions in the first scheduling request configuration.

10. A terminal device that transmits a scheduling request to a base station device, the terminal device comprising:
   a receiver configured to receive a signal including configuration information related to a scheduling request configuration associated with a logical channel; and
   controller circuitry configured to:
      control a counter associated with the scheduling request configuration, and
      when a plurality of scheduling requests belonging to a single scheduling request configuration are simultaneously triggered,
         initialize a counter associated with the single scheduling request configuration, and
         transmit the plurality of scheduling requests as one scheduling request after initializing the counter associated with the single scheduling request configuration.

11. The terminal device according to claim 10, wherein the controller circuitry initializes the counter by setting zero that is an initial value into the counter.

12. A base station device that receives a scheduling request from a terminal device, the base station device comprising:
   a transmitter configured to transmit a signal including configuration information related to scheduling request configuration associated with a logical channel;
   a receiver configured to receive, when the transmitter transmits the signal including configuration information related to a reconfiguration of a first scheduling request configuration, a scheduling request of which a number of transmissions is counted by a counter,
      during counting a number of transmissions in the first scheduling request configuration, when receiving the signal including the configuration information related to the reconfiguration of the first scheduling request configuration, the counter, associated with a second scheduling request configuration after the reconfiguration, being figured to:
         take over the counted number of transmissions in the first scheduling request configuration, and
         count a number of transmissions in the second scheduling request configuration, continuously from the counted number of transmissions in the first scheduling request configuration; and
   processor circuitry configured to execute a process including allocating, when the scheduling request is received by the receiver, a resource to the terminal device in accordance with the scheduling request.

13. A wireless communication system comprising a terminal device configured to transmit and a base station including a receiver configured to receive a scheduling request, wherein
   the terminal device includes
      a receiver configured to receive a signal including configuration information related to a scheduling request configuration associated with a logical channel, and
      controller circuitry configured to:
      control a counter associated with the scheduling request configuration, and
      cause, when the receiver receives a signal including configuration information related to a reconfiguration of a first scheduling request configuration during counting a number of transmissions in the first scheduling request configuration, the counter associated with a second scheduling request configuration after the reconfiguration, to:
         take over the counted number of transmissions in the first scheduling request configuration, and
         count a number of transmissions in the second scheduling request configuration, continuously from the counted number of transmissions in the first scheduling request configuration.

* * * * *